March 17, 1931. A. BIEDENFELD 1,796,743
ATTACHMENT FOR CORN PLANTERS
Filed Sept. 15, 1927
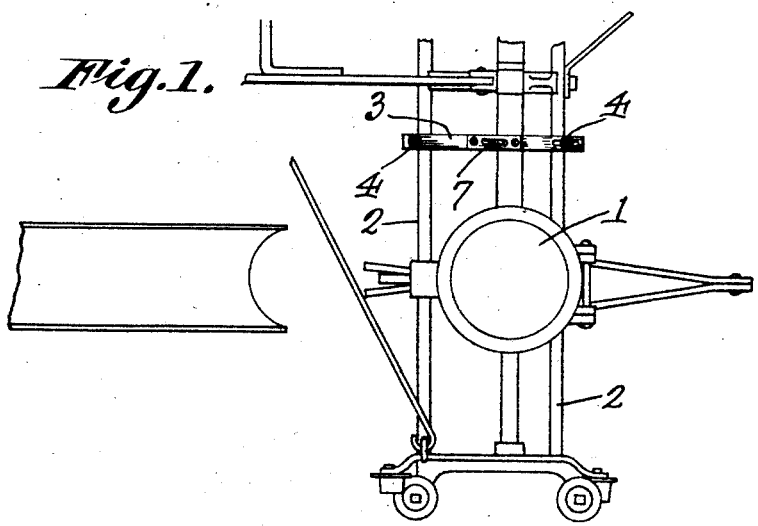
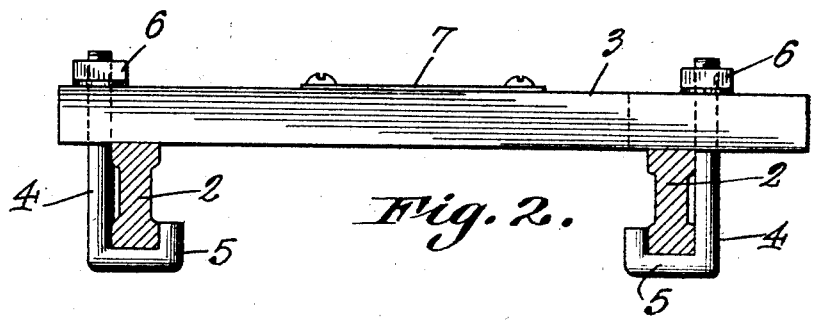
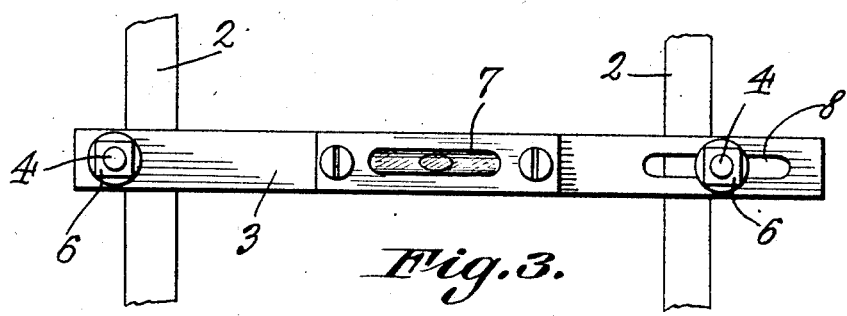
Inventor
Armin Biedenfeld
By C. A. Snow & Co.
Attorneys.

Patented Mar. 17, 1931

1,796,743

UNITED STATES PATENT OFFICE

ARMIN BIEDENFELD, OF FAULKTON, SOUTH DAKOTA

ATTACHMENT FOR CORN PLANTERS

Application filed September 15, 1927. Serial No. 219,685.

This invention relates to an attachment for corn planters whereby the driver of the planter can determine readily at any time whether or not a machine is level. It is desirable, when planting corn, to have the hills so located that parallel rows will appear when the hills are viewed either transversely, longitudinally, or diametrically across the field. This arrangement is essential in order to facilitate cultivation of the plants. If corn is planted on an inclined surface by the use of a check row planter, the machine, when travelling in one direction will deposit the seed in hills out of line with those deposited during the movement of the machine in the opposite direction unless the machine is maintained substantially horizontal so as to insure proper engagement with the knots or enlargements on the wire at the proper time relative to the arrival of the planter at the point of dropping of the seed. If the machine is tilted in one direction the engagement with the tripping portion of the wire will be delayed. If the machine is tilted in the other direction the engagement will be advanced. Thus, unless the machine can be held substantially level and not tilted it will be seen that it will be practically impossible to have the hills properly alined.

All planters are equipped with means whereby they can be quickly tilted by raising or lowering portions thereof to maintain them level. It is necessary, however, for the driver to use his own judgement in determining the degree of movement of the machine necessary in order to correct the tilting due to the travel of the machine over an inclined surface. As a result his efforts toward maintaining the machine level have frequently been without desired results.

One of the objects of the present invention is to combine with a planter a level indicating device which can be attached readily to the frame of the planter and will be so located that the driver can readily determine at all times whether or not the machine is disposed at the proper angle.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

In the accompanying drawings the preferred form of the invention has been shown.

In said drawings,

Figure 1 is a plan view of a portion of a corn planter having the present improvements combined therewith.

Figure 2 is an enlarged longitudinal section through a portion of the frame of the planter showing the level indicator attached thereto.

Figure 3 is a plan view of the structure illustrated in Figure 2.

Referring to the figures by characters of reference 1 designates the feed hopper of a planter mounted as ordinarily upon cross bars 2 and provided with any suitable mechanism, not shown, whereby the seed can be dropped through cooperation with a check row wire. The level indicating device constituting the present invention includes a bar 3 adapted to rest upon the frame members 2 so as to parallel with the direction of movement of the machine. This bar may be held in place by means of bolts 4 having hooks 5 for straddling the bottom faces of the bars 2. The bolts extend through the bar 3 of the attachment and can be tightened by means of nuts 6. Thus bar 3 will be held fixedly relative to the frame of the machine. Bar 3 contains a level indicating device such as a spirit level 7 which can be of the usual construction but sufficiently large to be easily seen by the driver. Bar 3 may be provided with a longitudinal slot 8 in one end portion for the reception of one of the bolts 4 so as thus to be adjustable to cross bars 2 at different distances apart.

In practice, when the machine is being driven over a field the driver can at all times determine, by looking at the level indicator 7, whether or not the machine is pitched forwardly and downwardly or forwardly and upwardly. In either case he can, by means of the usual leveling apparatus, tilt the frame of the machine so as to make it level, the proper position being promptly indicated by the level indicator. Thus, by adjusting the machine as found necessary according to the indication of the level, the hills can be maintained in proper relation to each other because the dropping mechanism will not be actuated too soon or too late by the check wire.

Although this invention is especially useful while corn is being planted on the sides of hills, it is to be undersood that it will also be found advantageous under all planting conditions, whether the ground be level, rolling or hilly because it affords a means whereby the driver can quickly determine whether or not the dropping mechanism is properly positioned to insure alinement of the hills.

What is claimed is:

The combination with a planter frame including spaced bars extending transversely of the frame, of a bar extending longitudinally of the frame and supported by the transverse bars, a spirit level carried by the longitudinal bar and hooked bolts connected to the longitudinal bar and engaging the transverse bars, one of the bolts being adjustable lengthwise of the longitudinal bar.

In testimony that I claim the foregoing as my own, I have hereto affixed my signature.

ARMIN BIEDENFELD.